United States Patent

Kuroda

[11] Patent Number: 5,333,585
[45] Date of Patent: Aug. 2, 1994

[54] CONTROL DEVICE FOR IDLE ROTATION OF ENGINE

[75] Inventor: Toshiki Kuroda, Hyogo, Japan

[73] Assignee: Mitsubishi Denki Kabushiki Kaisha, Tokyo, Japan

[21] Appl. No.: 32,317

[22] Filed: Mar. 17, 1993

[30] Foreign Application Priority Data

Mar. 23, 1992 [JP] Japan ................................. 4-064939

[51] Int. Cl.⁵ ...................... F02D 41/16; F02D 43/00
[52] U.S. Cl. ..................................... 123/339; 123/418
[58] Field of Search ................................ 123/339, 418

[56] References Cited

U.S. PATENT DOCUMENTS 5,080,061  1/1992  Nishimura ........................ 123/339
5,172,665  12/1992 Kuroda ............................. 123/339

FOREIGN PATENT DOCUMENTS 61-53544  11/1986  Japan .
1282880   7/1972   United Kingdom .

Primary Examiner—Tony M. Argenbright
Attorney, Agent, or Firm—Sughrue, Mion, Zinn, Macpeak & Seas

[57] ABSTRACT

An apparatus for controlling idle revolutions of an engine which comprises a controlling member to control an idle revolution changing member so as to adjust the idle revolutions detected by the engine revolution detector to a predetermined number of idle revolutions, in which the controlling member fixes the idle revolution changing member to a predetermined condition during misfiring of the engine detected by a misfire detecting member. Therefore, hunting of the engine can be prevented, and a better riding is thus ensured.

5 Claims, 7 Drawing Sheets

CONTROL DEVICE FOR IDLE ROTATION OF ENGINE

BACKGROUND OF THE INVENTION

This invention relates to an idle rotation controller for an engine, which can maintain a desired number of revolutions per minute (hereinafter referred to as "RPM") when the engine is idling.

Conventional idle rotation controllers for engines are disclosed in, e.g., Japanese Patent Examined Publications Nos. sho. 49-40886 and 61-53544.

The controller disclosed in the above-mentioned Publication No. sho. 49-40886 operates to adjust the amount of intake air so that the RPM of the engine during idling maintain a predetermined desired value. This controller has a bypass air duct bypassing the throttle valve in the intake system of the engine. In the bypass air duct there is a control valve that controls the amount of air flowing in the duct from the upstream side of the throttle valve to the downstream side thereof. Therefore, the controller controls the amount of air by providing feedback control to the control valve in accordance with the difference between the actual RPM of the engine and the predetermined desired RPM.

The controller proposed in the above-mentioned Publication No. Sho. 61-53544 is disclosed to adjust the ignition timing of the engine to prevent the RPM of the engine from being dropped or varied due to fluctuations in load at idle. This controller employs feedback control in order to maintain the desired RPM of the engine control as well as to prevent variations in RPM. The feedback control is effected by correcting the ignition timing in accordance with the difference between the actual RPM of the engine and the desired RPMs or with the variations in RPM.

The idle rotation controllers thus organized have addressed the following problem. When misfire occurs in one of the cylinders of the engine and the RPMs of the engine varies greatly, a variation in the number of revolutions occurs in the engine due to the feedback control. This subjects the engine to a hunting condition. During the hunting condition, the engine may stop depending on load conditions and operate improperly.

SUMMARY OF THE INVENTION

The invention overcomes the above problem and provides an apparatus for controlling an idle rotation of an engine which can prevent engine stop due to the drop in RPM and hunting caused by misfire.

An apparatus for controlling idle revolutions of an engine comprises means for detecting a number of revolutions of said engine; means for adjusting idle revolutions of said engine; means for detecting a misfire of said engine; and means for controlling said adjusting means to adjust the idle revolutions detected by said engine revolution detecting means to a predetermined number of idle revolutions, wherein said controlling means fixes said adjusting means to a predetermined condition during the misfire condition of said engine detected by said misfire detecting means.

Further, the apparatus comprises a bypass air passage bypassing a throttle valve of said engine, in which said adjusting means may change an amount of air flowing through said bypass air passage. Therefore, the apparatus interrupts air flow rate control by the idle RPM controlling means when misfire of the engine is detected by the misfire detecting means.

Alternately, said adjusting means may change an ignition timing of said engine. Therefore, the apparatus interrupts ignition timing control by the idle RPM controlling means when the misfire is detected by the misfire detecting means. When the engine is accidentally misfiring during idle, the engine is brought back to the state it was at before it was controlled by the idle RPM controlling means.

BRIEF DESCRIPTION OF THE DRAWINGS

FIG. 3 (a) to FIG. 3(d) are diagrams showing states of the engine at idle.

DETAILED DESCRIPTION OF THE PREFERRED EMBODIMENTS

A first embodiment of this invention will now be described in detail with reference to FIGS. 1 to 7. The term "RPM" herein used stands for the number of revolutions of an engine.

Figure 1:
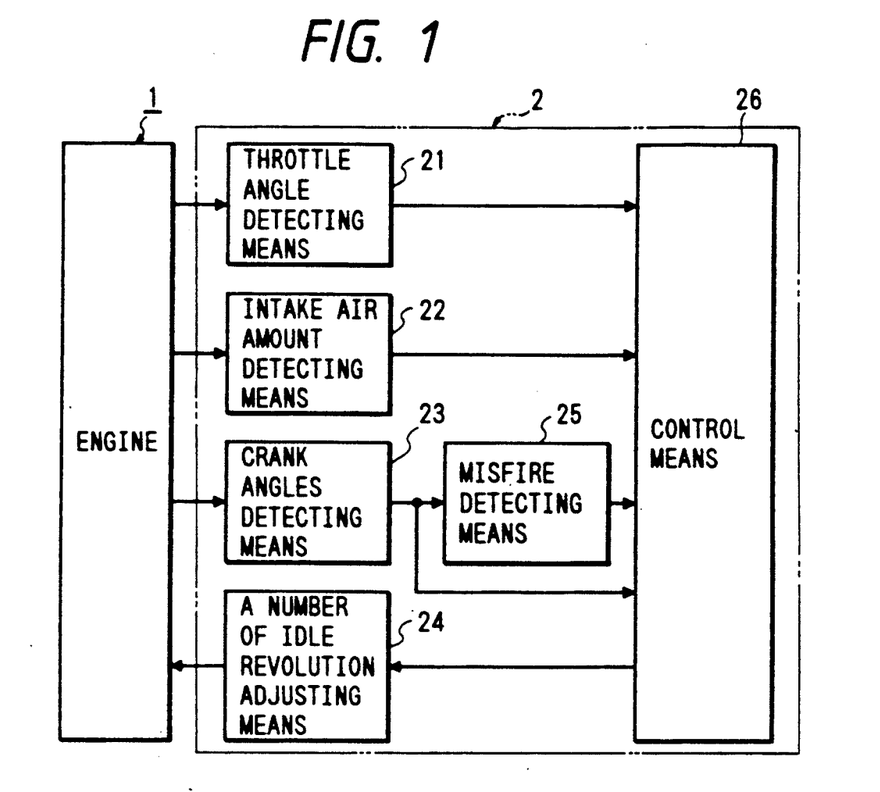
FIG. 1 is a functional block diagram showing the basic organization of an idle rotation controller for an engine, which is a first embodiment of this invention.
Figure 2:
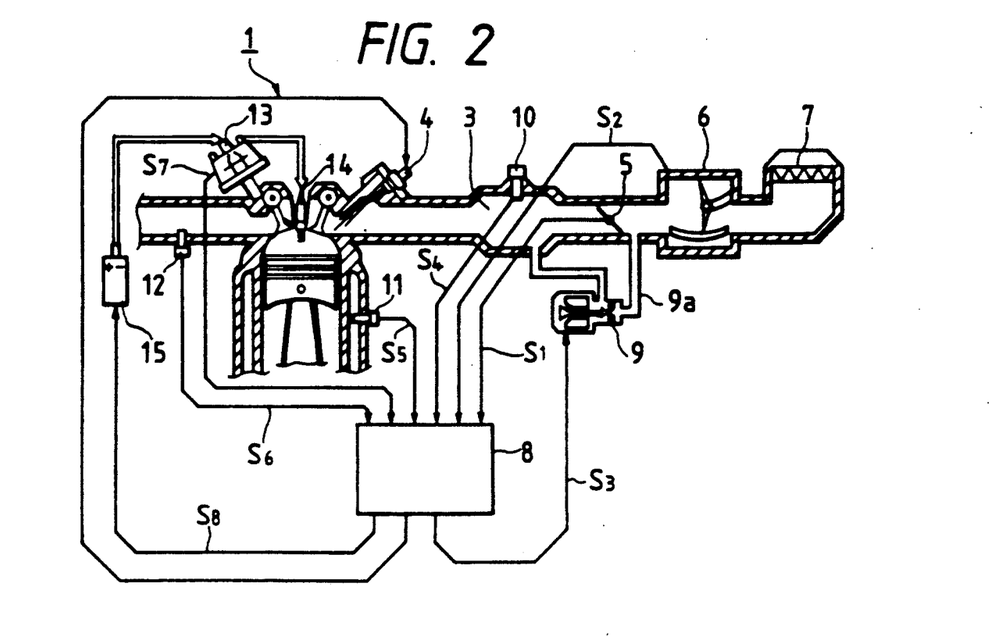
FIG. 2 is a schematic diagram showing the construction of an engine having the idle rotation controller shown in FIG. 1.
Figure 3A:
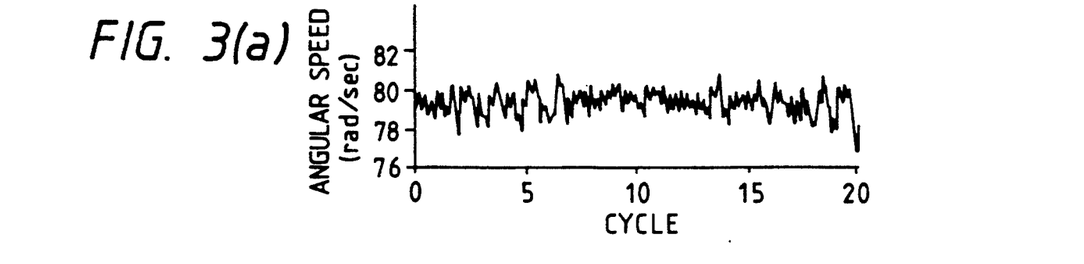
FIG. 3(a) thereof shows an angular velocity state when the engine is normal, FIG. 3(b) snows an angular velocity state when the engine is misfiring.
Figure 3B:
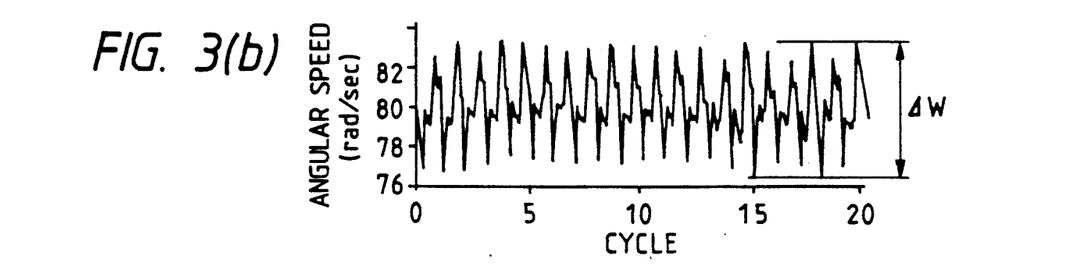

FIG. 1 is a functional block diagram showing the basic organization of an idle rotation controller for an engine, which is the first embodiment of this invention. FIG. 2 is a schematic diagram showing the construction of an engine having the idle rotation controller. FIG. 3(a) to FIG. 3(d) are diagrams showing states of the engine at idle: FIG. 3(a) thereof shows an angular velocity state when the engine is normal; FIG. 3(b) shows an angular velocity state when the engine misfires; FIG.

Figure 3C:
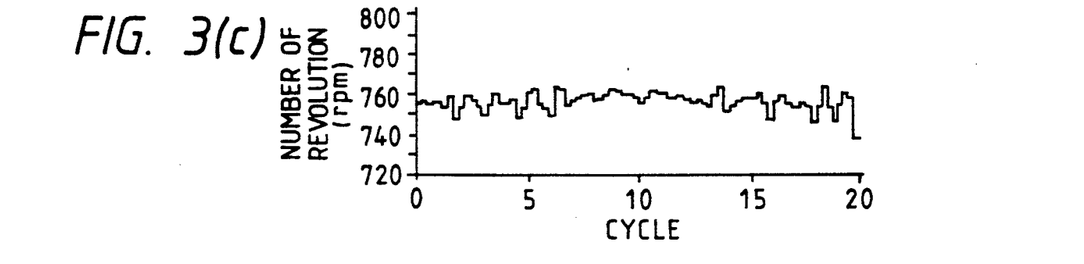
FIG. 3(c) shows a RPM variation when the engine is normal.
Figure 3D:
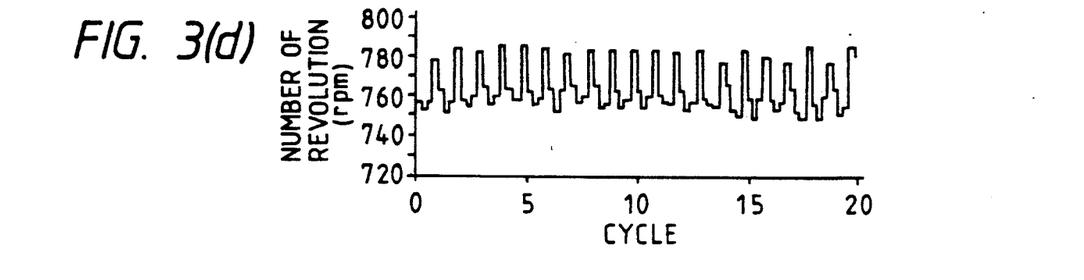
FIG. 3(d) shows a RPM variation when the engine is misfire.

3(c) shows an RPM variation when the engine is normal; and FIG. 3(d) shows an RPM variation when the engine misfires.

Figure 4:
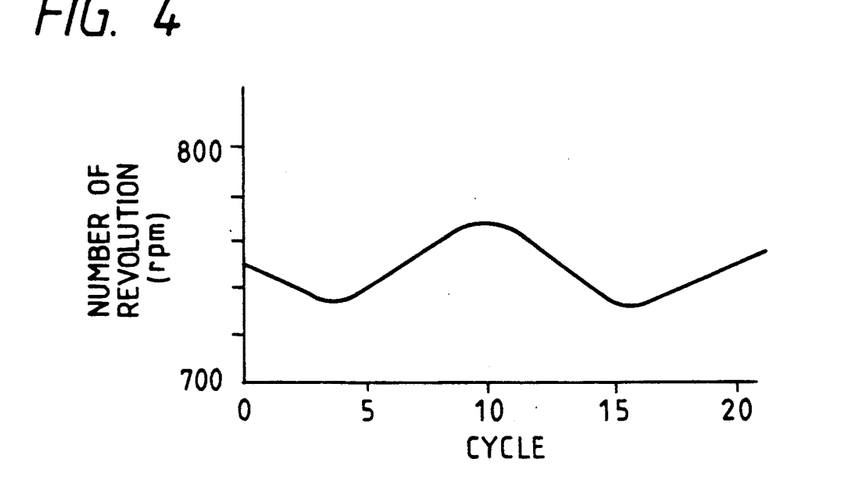
FIG. 4 is a diagram showing a hunting state of the engine.
Figure 5:
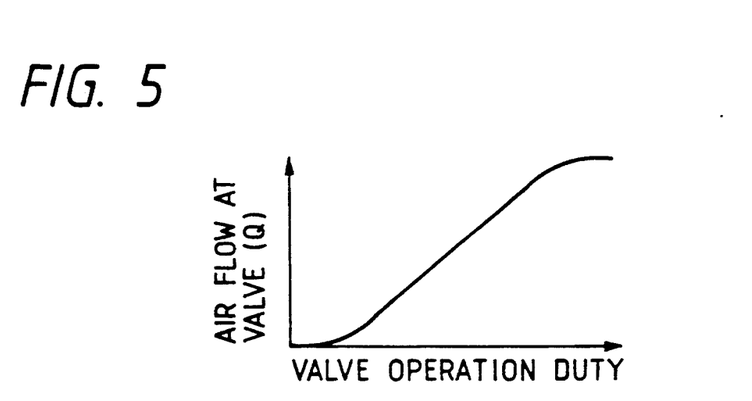
FIG. 5 is a diagram showing between the flow rate and the bypass air control valve duty when the idle rotation controller shown in FIG. 1 is operated.
Figure 6:
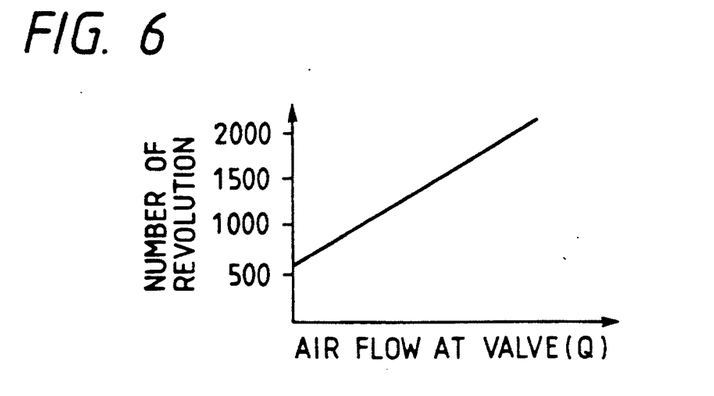
FIG. 6 is a diagram showing between the RPM of the engine and the air flow rate by the bypass air control valve when the idle rotation controller shown in FIG. 1 is operated.
Figure 7:
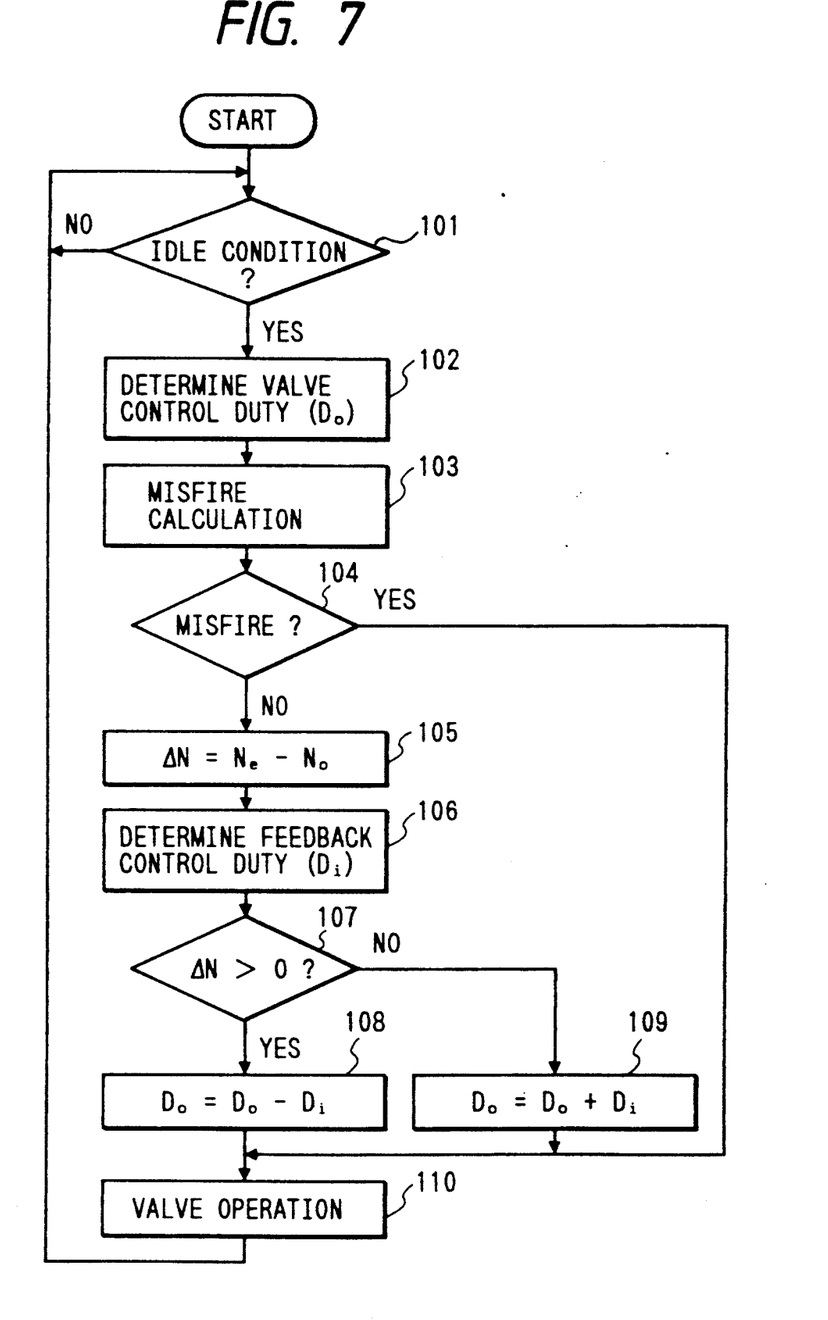
FIG. 7 is a flowchart illustrative of an operation of the idle rotation controller shown in FIG. 1.

FIG. 4 is a diagram showing a hunting state of the engine. FIG. 5 is a diagram showing the flow rate corresponding to the bypass air control valve duty when the idle rotation controller is operated. FIG. 6 is a diagram showing the RPM of the engine corresponding to the air flow rate by the bypass air control valve when the idle rotation controller is operated. FIG. 7 is a flowchart illustrative of an operation of the idle rotation controller.

In these figures, an engine 1 is provided with an idle rotation controller 2 which is employed in the first embodiment of this invention. As shown in FIG. 2, an intake system of the engine 1 is provided with a fuel injector 4, a throttle actuator 5, an airflow-meter 6, and an air cleaner 7, and the like, which are mounted on an intake manifold 3.

The injector 4 is controlled by an engine control unit 20 (hereinafter referred to simply as "control unit") 8 used in the idle rotation controller 2, which injects fuel according to an injection pulse set by the control unit 8.

The throttle actuator 5 has a structure controlling the intake air flow rate. A throttle position sensor (not shown) and a throttle complete close switch (not shown) are connected to the throttle actuator 5. The throttle position sensor and the throttle complete close switch are designed to output a throttle opening angle signal $S_1$ to the control unit 8. The airflow-meter 6 supplies an intake air amount signal $S_2$ corresponding to an amount of the intake air to the control unit 8.

A bypass air control valve 9 controls the RPMs of the engine 1 at idle. The bypass air control valve 9 is interposed along a bypass air passage 9a that communicates the upper side of the throttle actuator 5 with the lower side thereof, so that the intake air amount is controlled by increasing or decreasing the sectional area of the bypass air passage 9a, in which the operation thereof can be controlled by a rotation feedback signal $S_3$ from the control unit 8. That is, the RPM of the engine increases as the air amount passing through the bypass air passage 9a increases, whereas the RPM of the engine decreases as the air amount decreases.

An intake air temperature sensor 10 detects the temperature of intake air. A water temperature sensor 11 detects the temperature of cooling water of the engine 1. An exhaust air temperature sensor 12 detects the temperature of the air discharged from the engine 1. These sensors 10 to 12 apply an intake air temperature signal $S_4$, a water temperature signal $S_5$ and an exhaust air temperature signal $S_6$ to the control unit 8.

A crank angle sensor 13 detects the crank angle of the engine 1. The crank angle sensor 13 detects the crank angle in a valve driving device of the engine 1 and applies a crank angle signal $S_7$ to the control unit 8.

Further an ignition plug 14 and an ignition coil 15 are provided. The ignition coil 15 applies a voltage to the ignition plug 14 by an ignition signal $S_8$ outputted from the control unit 8.

Hereinafter, the idle rotation controller 2 of this invention will be described in detail.

As shown in FIG. 1, the idle rotation controller 2 includes a throttle opening angle detecting means 21, an intake air amount detecting means 22, a crank angle detecting means 23, an idling revolution adjusting means 24, a misfire detecting means 25, and a control means 26.

The throttle opening angle detecting means 21 determines the throttle opening angle based on the throttle opening angle signal $S_1$ from the throttle position sensor and throttle complete close switch connected to the throttle actuator 5 shown in FIG. 2.

The intake air amount detecting means 22 detects the intake air amount of the engine 1, and is implemented by, e.g., the airflow-meter 6 shown in FIG. 2 or the throttle position sensor. The crank angle detecting means 23 detects the crank angle of the engine 1, and is implemented by the crank angle sensor 13 shown in FIG. 2.

The idle rotation adjusting means 24 adjusts the RPMs of the engine 1 at idle, and the means 24 is implemented by the bypass air control valve 9 shown in FIG. 2.

The misfire detecting means 25 determines the angular speed of the rotating engine 1 by a period resulting from every predetermined crank angle based on the crank angle signal $S_7$ applied from the crank angle sensor 13 (the crank angle detecting means 23), so that a control signal of the misfire occurrence is output to a control means 26 (described later) when the difference between one angular speed at one detecting point and another angular speed at another detecting point within one cycle becomes larger than a predetermined value of the difference.

The control means 26 is provided in the control unit 8 shown in FIG. 2 and determines the RPMs of the engine 1 by a period between predetermined crank angles based on the crank angle signal $S_7$ applied from the crank detecting means 23, so that the idle rotation adjusting means 24 is subjected to feedback control so as to adjust an actually measured RPM of the engine 1 to a desired RPM. Further, when the misfire detecting means 25 detects a misfire, the control means 26 controls the idle rotation adjusting means 24 in open loop control while interrupting the feedback control.

The control unit 8 shown in FIG. 2 includes a CPU and has functions such as fuel control and ignition control as generally known, in addition to the idle feedback control by the detecting means 21 to 25 and the control means 26.

For fuel control, first a basic injection pulse corresponding to the inlet air amount/RPM of the engine 1 is calculated and then an actual injection pulse is obtained by making a temperature correction on the basis of the water temperature signal $S_5$ from the water temperature sensor 11. The injector 4 is driven by the actual injection pulse.

For ignition control, the ignition signal $S_8$ is applied to the ignition coil 15 to drive the ignition plug 14.

The operation of the idle rotation controller 2 of this invention will be described as follows.

When the engine 1 is at idle under normal condition, the angular speed of the engine 1 is substantially stable as shown in FIG. 3 (a). Variations in RPM are as shown in FIG. 3 (c). When the misfire occurs on the engine the angular speed deviates with a larger amplitude $\Delta\omega$ than a predetermined value under normal condition. And similarly variations in RPM are larger as shown in FIG. 3 (d).

A conventional controller performs feedback control by changing the inlet air amount so that the idle RPM keeps the desired RPM even when the engine 1 misfires. As a result, the rotation of the engine 1 pulsates as shown in FIG. 4, causing the engine to hunt.

The inventors, paying attention to this point, have made this invention to prevent hunting due to misfire at the engine shown in FIG. 4.

The operation of the idle rotation controller 2 of this invention will now be described with reference to a flowchart shown in FIG. 7.

In Step 101, whether or not the throttle actuator 5 has been completely closed, i.e., whether the engine 1 is at idle, is determined on the basis of the throttle opening angle signal $S_1$ from the throttle opening angle detecting means 21, and the controller 2 waits until the throttle actuator 5 becomes completely closed. When the throttle actuator 5 has been completely closed, i.e., when the engine 1 is idling, the controller 2 executes Step 102.

In Step 102, the operation condition of the engine 1 is determined on the basis of the temperature signal $S_4$ of the inlet air temperature sensor 10, the temperature signal $S_5$ of the water temperature sensor 11, and the inlet air amount signal $S_2$ of the inlet air amount detecting means 22 to thereby determine a control duty value ($D_o$) of the bypass air control valve 9, which is the idle RPM adjusting means 24 in open loop control.

Then, in Step 103, the misfire detecting means 25 determines the angular speed for every predetermined crank angle on the basis of the crank angle signal $S_7$ of the crank angle detecting means 23. And in Step 104, the controller 2 determines that the engine 1 is misfiring either when the angular speed amplitude $\Delta\omega$ shown in FIG. 3 (b) becomes larger than a predetermined value or when an average variation within predetermined cycles becomes larger than a predetermined value.

When an occurrence of the misfire condition has been determined in Step 104, Step 110 (described later) is executed. If no misfire has been detected, Step 105 for feedback control on rotation is executed.

In Step 105, a period for every predetermined crank angle is calculated from the crank angle signal $S_7$ of the crank angle detecting means 23 to determine an RPM ($N_e$) of the engine 1. In the case, one of desired RPM ($N_o$) is read from a plurality of desired RPM ($N_o$) corresponding to a plurality of values of the temperature of the engine water, which are stored in a memory of the control means 26 in advance, as a result of comparison the values of the temperature with the temperature signal $S_5$ of the water temperature sensor 11. And then a difference $\Delta N$ between $N_e$ and $N_o$ is calculated.

Then, in Step 106, a feedback control duty ($D_i$) corresponding to $\Delta N$ calculated in Step 105 is determined, and whether or not $\Delta N$ is positive or negative is determined in Step 107. If $\Delta N$ is positive, a correction duty is subtracted from the control duty in Step 108, whereas if $\Delta N$ is negative, the correction duty is added to the control duty in Step 109, so that a control duty $D_o$ as a feedback control duty is determined in each case.

When the control duty increases, the air amount flowing through the bypass air control valve 9 increases, whereas when the control duty decreases, the air amount decreases. Such a relationship is shown in FIG. 5.

The controller 2 executes Step 110 thereafter. The rotation feedback signal $S_3$ is outputted from the control unit 8 with the control duty $D_o$ as a drive duty value of the idle RPMs adjusting means 24. The bypass air passage sectional area is adjusted by the bypass air control valve 9 serving as the idle RPM adjusting means 24. That is, as shown in FIG. 6, the RPM of the engine 1 at idle is controlled by changing the flow rate at the valve 9 (the air amount passing through the bypass air control valve 9).

Therefore, when the engine 1 is misfiring, the feedback control is interrupted by the idle RPM adjusting means 24. As a result, when the engine 1 misfires at idle, the engine 1 is brought back to a state before the feedback control effected by the idle RPM adjusting means 24. Thus hunting of the engine 1 can be prevented.

Then, an idle rotation controller for an engine, which is a second embodiment of this invention, will be described next in detail with reference to FIGS. 8 to 13.

Figure 8:
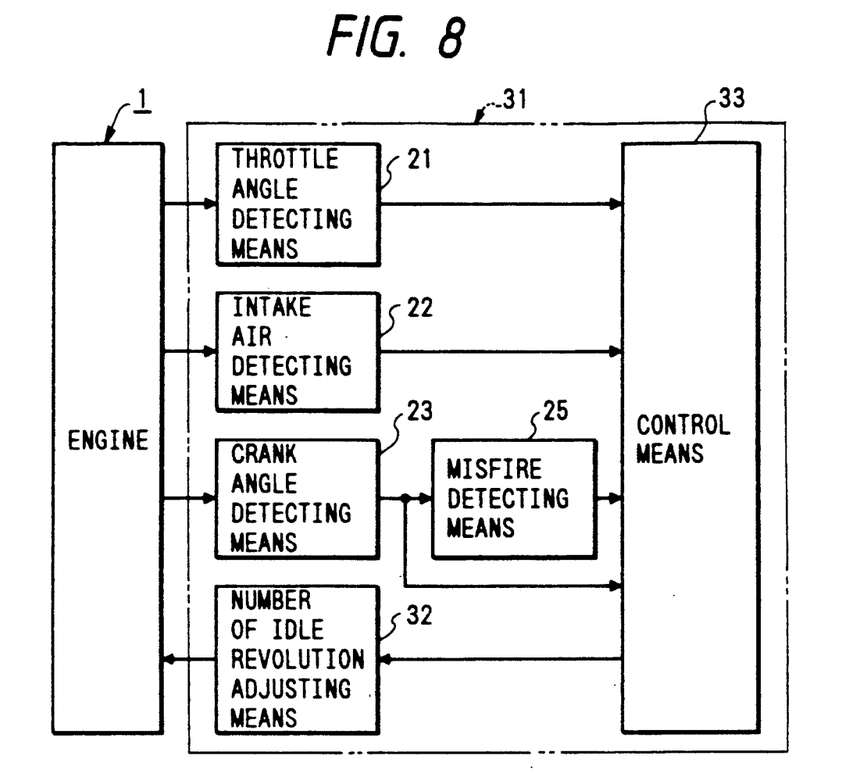
FIG. 8 is a functional block diagram showing the basic organization of an idle rotation controller, which is a second embodiment of this invention.
Figure 9:
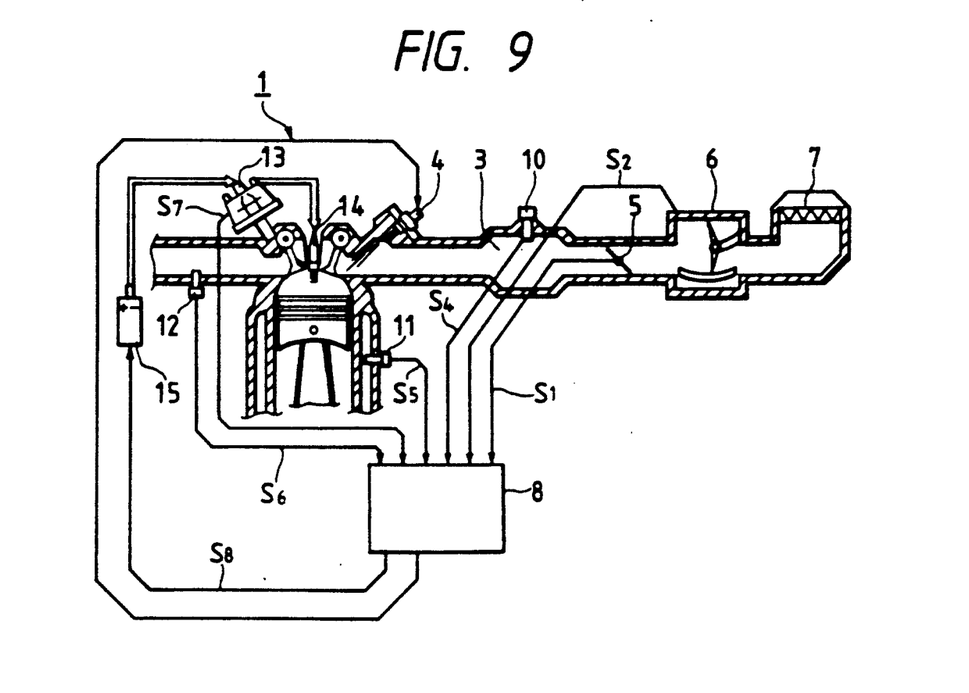
FIG. 9 is a schematic diagram showing the construction of an engine having the idle rotation controller shown in FIG. 8.
Figure 10:
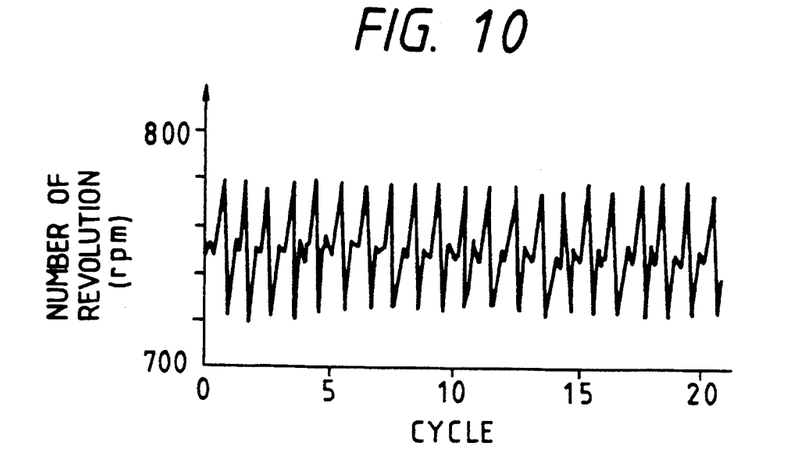
FIG. 10 is a diagram showing a hunting state of the engine.
Figure 11:
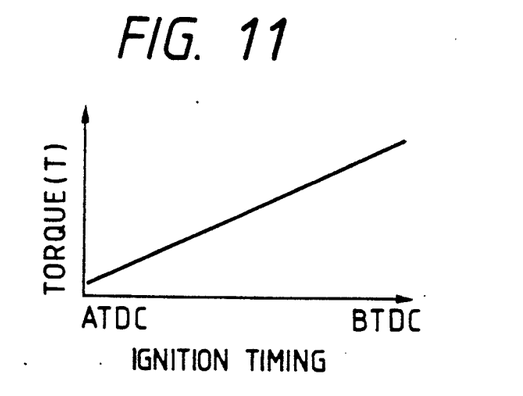
FIG. 11 is a diagram showing a relation between the ignition timing and the torque in the idle rotation controller shown in FIG. 8.
Figure 12:
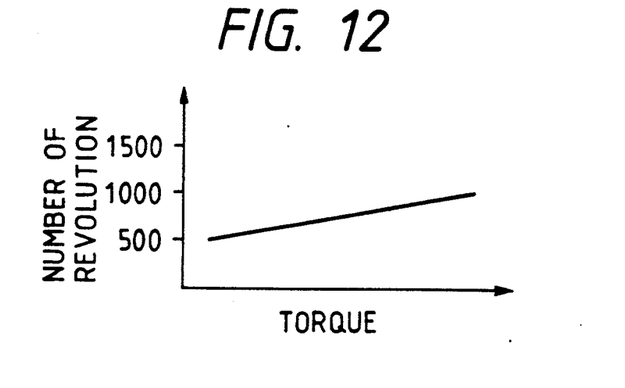
FIG. 12 is a diagram showing a relation between the RPMs and the torque in the idle rotation controller shown in FIG. 8.
Figure 13:
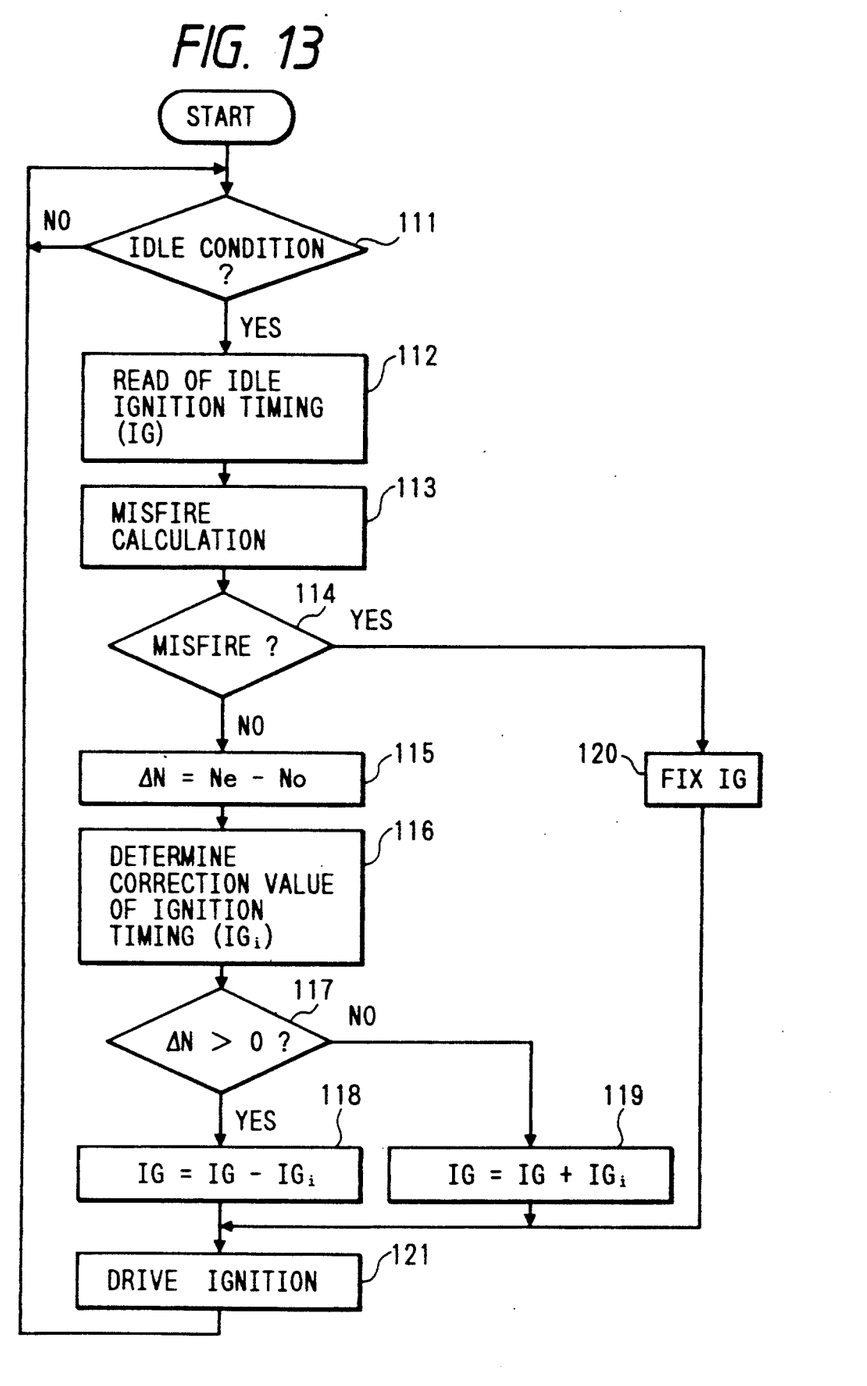
FIG. 13 is a flowchart illustrative of an operation of the idle rotation controller shown in FIG. 8.

FIG. 8 is a functional block diagram showing the basic organization of an idle rotation controller, which is a second embodiment of this invention. FIG. 9 is a schematic diagram showing the construction of an engine having the idle rotation controller shown in FIG. 8. FIG. 10 is a diagram showing a state when the engine hunts. FIG. 11 is a diagram showing a relation between the ignition timing and the torque in the idle rotation controller shown in FIG. 8. FIG. 12 is a diagram showing relation between the torque and the RPMs in the idle rotation controller shown in FIG. 8. FIG. 13 is a flowchart illustrative of an operation of the idle rotation controller shown in FIG. 8. In these figures, the parts and components having same or like characteristics as in FIGS. 1 to 7 are designated by the same reference numerals and a detailed description thereof will be omitted.

In FIG. 8, the idle rotation controller 31 is accorded with the second embodiment of this invention, which has the same organization as the idle rotation controller 2 which is accorded with the first embodiment of this invention, except for an idle RPM adjusting means 32 and a control means 33.

An idle RPM adjusting means 32 changes the ignition timing of the engine 1 so that a desired RPM stored in advance in the control means 33 becomes equal to an actual RPM of the engine 1. The ignition timing is changed by changing the timing for applying the ignition signal $S_8$ to the ignition coil 15. That is, when the ignition timing is adjusted by the idle RPM adjusting means 32, the torque of the engine changes to thereby cause the RPM thereof to be adjusted. If the ignition timing is anticipated, the torque increases to increase the RPM, whereas if the ignition timing is delayed, the torque decreases to decrease the RPM.

The control means 33 feedback-controls the idle RPM adjusting means 32, and further when the misfire has been detected by the misfire detecting means 25, interrupts the feedback control and applies an open loop control to the idle RPMs adjusting means 32 based on a fixed value or a control value corresponding to both the RPM of the engine 1 and the inlet air amount. The control means 33 has fuel control and ignition control functions, in addition to the idle rotation feedback control.

The operation of the idle rotation controller 31 thus arranged will be described.

A conventional controller that controls the idle RPMs by controlling the ignition timing effects feedback control even when the engine is on misfire while changing the ignition timing so that the RPM match a desired RPM. As a result, as shown in FIG. 10, the engine rotates in pulsation, thus causing the engine to hunt. In ignition timing-based feedback control, since the RPM control response is quick for changing the torque of the engine, such hunting of the engine is characterized as being in synchronism with the angular velocity variation as shown in FIG. 10, not being a hunting whose cycle is so long as shown in FIG. 4.

The operation will be described below with reference to FIG. 13.

In Step 111, it is determined whether or not the throttle actuator 5 is completely closed from the throttle opening angle signal $S_1$ applied from the throttle opening angle detection means 21, and the controller waits until the actuator 5 is actually completely closed. When the throttle actuator 5 has been completely closed, i.e., when the engine is at idle, the controller executes Step 112.

In Step 112, an ignition timing (IG) at which the ignition coil 15 energizes the ignition plug 14 for ignition at idle is determined by reading from the memory in the control means 33.

Then, in Step 113, the misfire detecting means 25 detects the angular velocity for every predetermined crank angle from the crank angle signal $S_7$ of the crank angle detecting means 23. And in Step 114, the controller 2 determines that the engine 1 is on misfiring either when the angular velocity amplitude $\Delta\omega$ shown in FIG. 3 (b) becomes larger than a predetermined value or when an average variation within predetermined cycles becomes larger than a predetermined value.

The controller 2 executes Step 120 upon detection of a misfire in Step 114, and the controller 2 proceeds to Step 121 to fix the ignition timing (IG). If no misfire has been detected, the controller 2 executes Step 115 for feedback control on rotation.

In Step 115, a period for every predetermined crank angle is calculated from the crank angle signal $S_7$ of the crank angle detecting means 23 to determine an RPM ($N_e$) of the engine 1. Then, a desired RPM ($N_o$) is read from a plurality of desired RPMs ($N_o$) corresponding to a plurality of values of the temperature of the engine water, which are stored in advance within a memory of the control means 26, as a result of comparison of the values of the temperature with the temperature signal $S_5$ of the water temperature sensor 11. And then a difference $\Delta N$ between $N_e$ and $N_o$ is calculated.

Then, the controller 2 executes Step 116, in which a feedback control correction ignition timing ($IG_i$) corresponding to $\Delta N$ calculated in Step 115 is determined. And in Step 117 whether or not $\Delta N$ is positive or negative is determined. If $\Delta N$ is positive, in Step 118, a correction ignition timing ($IG_i$) is subtracted from the ignition timing at idle (IG), whereas if $\Delta N$ is negative, in Step 119, the correction ignition timing ($IG_i$) is added to the ignition timing at idle, so that IG is determined as a feedback control ignition timing in each case. The relationship between the ignition timing and the torque is as shown in FIG. 11, from which it is apparent that the torque increases as the ignition timing is anticipated.

Then, Step 121 is executed to apply the ignition signal $S_8$ from the control means 33 to the ignition coil 15 with the ignition timing (IG) as an ignition timing value at the idle RPM adjusting means 32. The ignition coil 15 energizes the ignition plug 14 at the above-mentioned timing, thus causing the ignition timing of the engine 1 to be adjusted. And, as shown in FIG. 12, the RPM of the engine 1 at idle is controlled by adjusting the torque.

Therefore, when the engine 1 is on misfire, the feedback control is interrupted by the idle RPM adjusting means 32. As a result, when the engine 1 is on misfire at idle, the engine 1 is brought back to a state before the engine 1 has been controlled by the idle RPM adjusting means 32. Thus, hunting of the engine 1 can be prevented.

The above embodiments use, as the misfire detecting means 25, a misfire determined system in which a misfire is detected when the angular velocity of the engine 1 is detected by detecting the period for every predetermined crank angle from the crank angle signal $S_7$ of the crank angle detecting means 23 and the difference between one angular velocity at one detecting point and another angular velocity at another detecting point within a single cycle becomes equal to or greater than a predetermined value. However, this invention is not limited thereto; other detecting means may also be employed. Other detecting means may include, e.g., misfire detector that detects a pressure within a cylinder or misfire detector that detects ionization current flowing through the tip of the ignition plug 14.

As described in the foregoing pages, the first aspect of this invention is applied to an idle rotation controller for an engine, which includes: an idle RPM adjusting means for adding a change to RPM of the idle revolutions by changing an amount of air flowing through a bypass air passage bypassing a throttle valve; means for detecting the RPM of the engine; means for detecting a misfire on the engine; and a controller for not only controlling the idle RPM adjusting means so that the RPM of the engine detected by the engine RPM detecting means at idle becomes equal to a predetermined desired idle RPM, but also interrupting an air flow rate control by the idle RPM adjusting means when a misfire of the engine is detected by the misfire detecting means. The second aspect of this invention is applied to an idle rotation controller for an engine, comprising: an idle RPM adjusting means for adding a change to RPM of the idle revolutions by changing an ignition timing; means for detecting the RPM of the engine; means for detecting a misfire on the engine; and a controller for not only controlling the idle RPM adjusting means so that the RPM of the engine detected by the engine RPM detecting means at idle becomes equal to a predetermined desired idle RPM, but also interrupting an ignition timing control by the idle RPM adjusting means when a misfire of the engine is detected by the fire detecting means. Therefore, when the engine is on misfire at idle, the engine is brought back to a state before the engine has been controlled by the idle RPM adjusting means.

As a result, hunting of the engine can be prevented, which contributes to improving not only the stability of engine operation but also riding conditions when the controller is applied to automotive engines. Further, stoppage of the engine due to drop in RPM can be prevented.

While description has been made of the particular embodiments of this invention, it will be understood that many modifications may be made without departing from the spirit thereof. The appended claim is contemplated to cover any such modifications as fall within the true spirit and scope of this invention.

What is claimed is:

1. An apparatus for controlling idle revolutions of an engine, comprising:
   means for detecting a number of revolutions of said engine;
   means for adjusting idle revolutions of said engine;
   means for detecting a misfire of said engine; and
   means for controlling said adjusting means to adjust the idle revolutions detected by said engine revolution detecting means to a predetermined number of idle revolutions, wherein said controlling means fixes said adjusting means to a predetermined condition during a misfire condition of said engine detected by said misfire detecting means.

2. An apparatus according to claim 1, wherein said misfire detecting means determines the misfire condition of said engine when a deviation of said number of the revolutions of said engine detected by said revolution detecting means exceeds a predetermined level.

3. An apparatus according to claim 1, wherein said revolution detecting means includes crank angle detecting means.

4. An apparatus according to claim 1, further comprising a bypass air passage bypassing a throttle valve of said engine, wherein said adjusting means changes an amount of air flowing through said bypass air passage.

5. An apparatus according to claim 1, wherein said adjusting means changes an ignition timing of said engine.

* * * * *